(12) United States Patent
Kato et al.

(10) Patent No.: US 6,781,631 B1
(45) Date of Patent: Aug. 24, 2004

(54) LENS CONTROL UNIT

(75) Inventors: Hiroshi Kato, Omiya (JP); Koshi Kuwakino, Omiya (JP)

(73) Assignee: Fuji Photo Optical Co., Ltd., Saitama (JP)

( * ) Notice: Subject to any disclaimer, the term of this patent is extended or adjusted under 35 U.S.C. 154(b) by 0 days.

(21) Appl. No.: 09/406,792

(22) Filed: Sep. 28, 1999

(30) Foreign Application Priority Data

Sep. 30, 1998 (JP) .......................................... 10-278018

(51) Int. Cl.⁷ ........................ H04N 5/232; H04N 5/225; G03B 13/00
(52) U.S. Cl. ....................... 348/345; 348/373; 348/375; 348/357
(58) Field of Search ............................... 348/372, 373, 348/335, 345, 347, 357, 375; 359/823, 822, 690, 701, 379, 382, 383; 396/133, 50, 259, 260, 131, 79, 87; 353/100, 101

(56) References Cited

U.S. PATENT DOCUMENTS

| | | | |
|---|---|---|---|
| 5,253,007 A | * 10/1993 | Tokura et al. ............... | 396/133 |
| 5,270,855 A | * 12/1993 | Hasegawa ................... | 359/368 |
| 5,633,680 A | * 5/1997 | Kaneko et al. ............. | 348/357 |
| 5,684,627 A | * 11/1997 | Ganser et al. .............. | 359/388 |
| 5,826,117 A | * 10/1998 | Kawamura et al. .......... | 396/79 |
| 5,884,107 A | * 3/1999 | Yajima ........................ | 396/86 |
| 6,219,098 B1 | * 4/2001 | Kawamura et al. ......... | 348/335 |

FOREIGN PATENT DOCUMENTS

JP          8-313793        11/1996

* cited by examiner

Primary Examiner—Wendy R. Garber
Assistant Examiner—Justin Misleh
(74) Attorney, Agent, or Firm—Birch, Stewart, Kolasch & Birch, LLP

(57) ABSTRACT

A stopper pin for defining the rotational limits of a knob of a focus demand is provided on a gear that can be turned by a motor. When a preset shooting function and the like move a focus lens to shift the rotational limits of the knob with respect to the movement ends of the focus lens, the stopper pin is moved so that the rotational limits of the knob with respect to the current position thereof can correspond to the movement ends of the focus lens.

1 Claim, 4 Drawing Sheets

F I G. 3
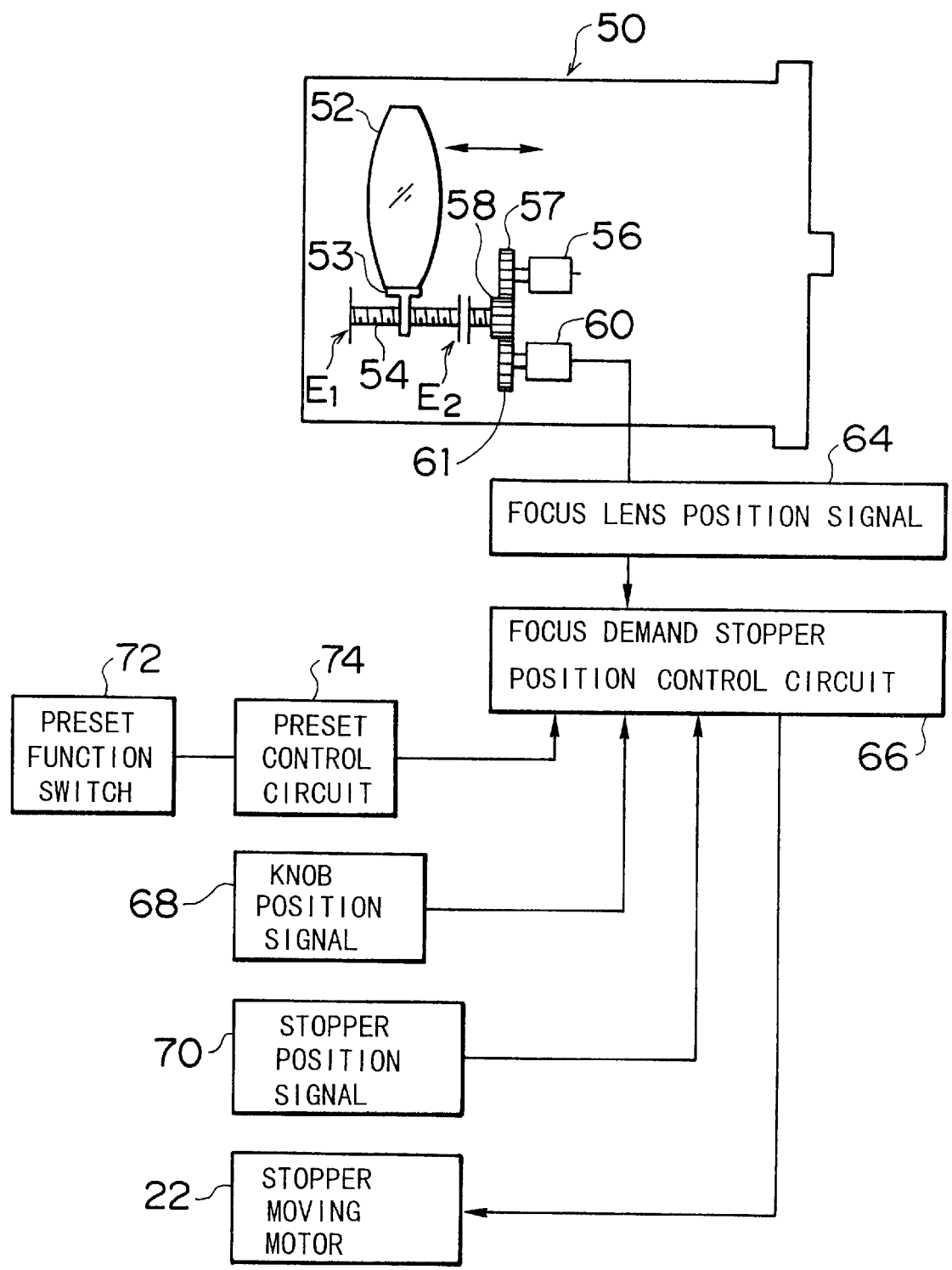

LENS CONTROL UNIT

BACKGROUND OF THE INVENTION

1. Field of the Invention

The present invention relates generally to a lens control unit, and more particularly to a lens control unit that generates control signals for electrically controlling the focusing and zooming of a lens device for use in a TV camera, or the like.

2. Description of Related Art

A control unit called a zoom rate demand or a focus position demand is used to control a TV lens device in the zooming, focusing, or the like. The control unit (demand) usually has a control member such as a ring and a knob. Manually turning the control member causes a potentiometer, a rotary encoder, or the like, which interlocks with the control member, to output electric signals (control signals) according to the operated amount of the control member. Then, a driving part such as a motor is controlled according to the electric signals to move a lens group in the TV lens device. Thus, the zooming or focusing is performed.

There is also a well-known TV lens device, which is provided with a preset shooting function for instantaneously reproducing the previously-stored focus position and zoom position by operating a button.

When the lens device connected to a focus demand activates the preset shooting function or an auto-focusing function, a position signal outputted from the focus demand is cut off and a lens (e.g., a focus lens) moves to a position indicated by a preset signal or the like. Then, when the preset shooting function or the auto-focusing function is cancelled, the focus lens returns to a position designated by the focus demand. If a subject is focused at the preset position, however, the image may be blurred as soon as the preset shooting function is cancelled.

To address this problem, it is preferable to maintain the state such as the focus position of the lens even if the preset shooting function is cancelled. In this case, the focus position can be prevented from changing due to the cancel of the preset shooting function if an incremental rotary encoder, or the like is used as a position sensor for determining the rotational angle (the turned position) of the control member of the focus demand and if stoppers are formed at both rotational ends of the control member of the focus demand. However, according to this structure, the stopper positions of the focus demand may shift from the ends of the focus lens. Consequently, even if the control member of the focus demand turns to the rotational limit or end, the focus lens cannot reach the end (a proximity end or an infinity end), and an area where the focus cannot be adjusted results.

Japanese Patent Provisional Publication No. 8-313793 pointed out a similar problem. This publication proposed the structure for prohibiting the rotation of the control member when an end detecting means provided in a lens device detects that a lens has reached the end. More specifically, teeth are formed at the outer circumference of a ring member that turns in association with the control member. When the lens reaches the end, a power source such as a motor is run to turn a stopper frame member so that the end of the stopper frame member engages with the teeth of the ring member to thereby stop the control member.

In the lens control apparatus of No. 8-313739, the power source such as the motor must be run to move the stopper frame member forward into the rotatable area of the ring member every time the lens is detected at the end. Therefore, a relatively large amount of energy is used, and the control system is complicated. In addition, the frequent rotation of the stopper frame member deteriorates the durability and causes mechanical troubles.

SUMMARY OF THE INVENTION

In view of the foregoing, it is an object of the present invention to provide a lens control unit, which is able to maintain the state of the lens and maintain the relation between the operational limits of the control member in the lens control apparatus and the movement limits (ends) of a lens (e.g. a focus lens) in the lens device if a control function such as a preset shooting function and an auto-focusing function other than the lens control unit is operated and then the control is cancelled, so that the operator can feel the operational limits of the control member at the movement limits of the lens.

To achieve the above-mentioned object, the present invention is directed to a lens control unit for outputting a signal corresponding to displacement of a control member and controlling a position of a lens according to the signal, the lens control unit comprising: the control member; a stopper member for defining an operational limit of the control member; a support mechanism for movably supporting the stopper member; a power source for supplying power to the support mechanism to move the stopper member; and a control part for controlling the power source to move the stopper member so that the operational limit of the control member with respect to a current position of the control member corresponds to a movement end of the lens with respect to a current position of the lens.

According to the present invention, if the operational limit of the control member is displaced from the movement end of the lens after the control function such as the preset shooting function other than the control unit is operated to move the lens, the control part determines the relation between the current position of the lens and the movement end of the lens, and controls the power source to move the stopper member so that the relation between the current position of the control member and the position of the stopper member can correspond to the relation between the current position of the lens and the movement end of the lens. Consequently, the operational limit of the control member can easily correspond to the movement end of the lens.

BRIEF DESCRIPTION OF THE DRAWINGS

The nature of this invention, as well as other objects and advantages thereof, will be explained in the following with reference to the accompanying drawings, in which like reference characters designate the same or similar parts throughout the figures and wherein:

FIG. 3 is a block diagram showing the structure of a focus control system of a TV lens according to an embodiment of the present invention.

DETAILED DESCRIPTION OF THE PREFERRED EMBODIMENT

This invention will be described in further detail by way of example with reference to the accompanying drawings.

Figure 1:
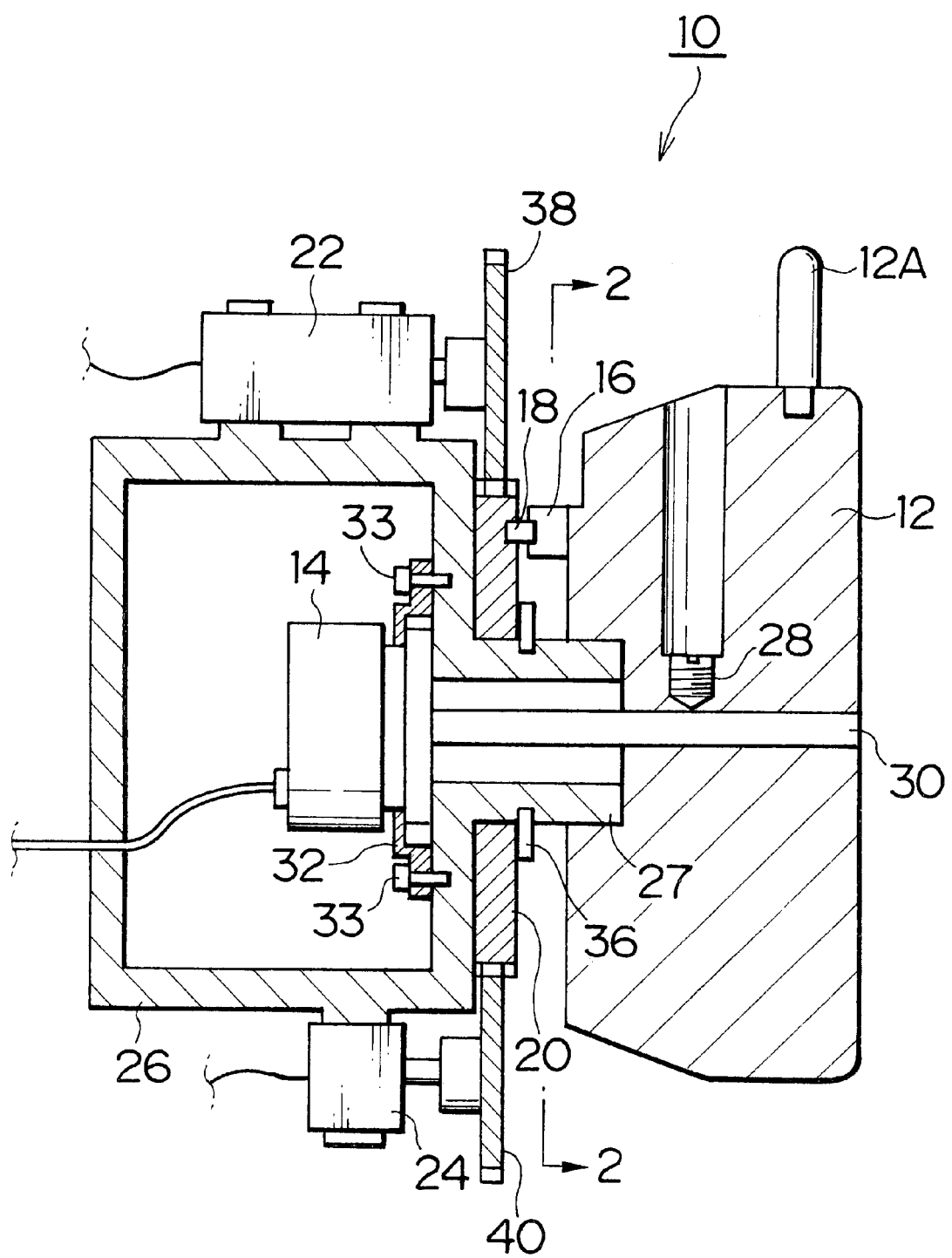
FIG. 1 is a sectional view showing a focus demand according to an embodiment of the present invention.
Figure 2:
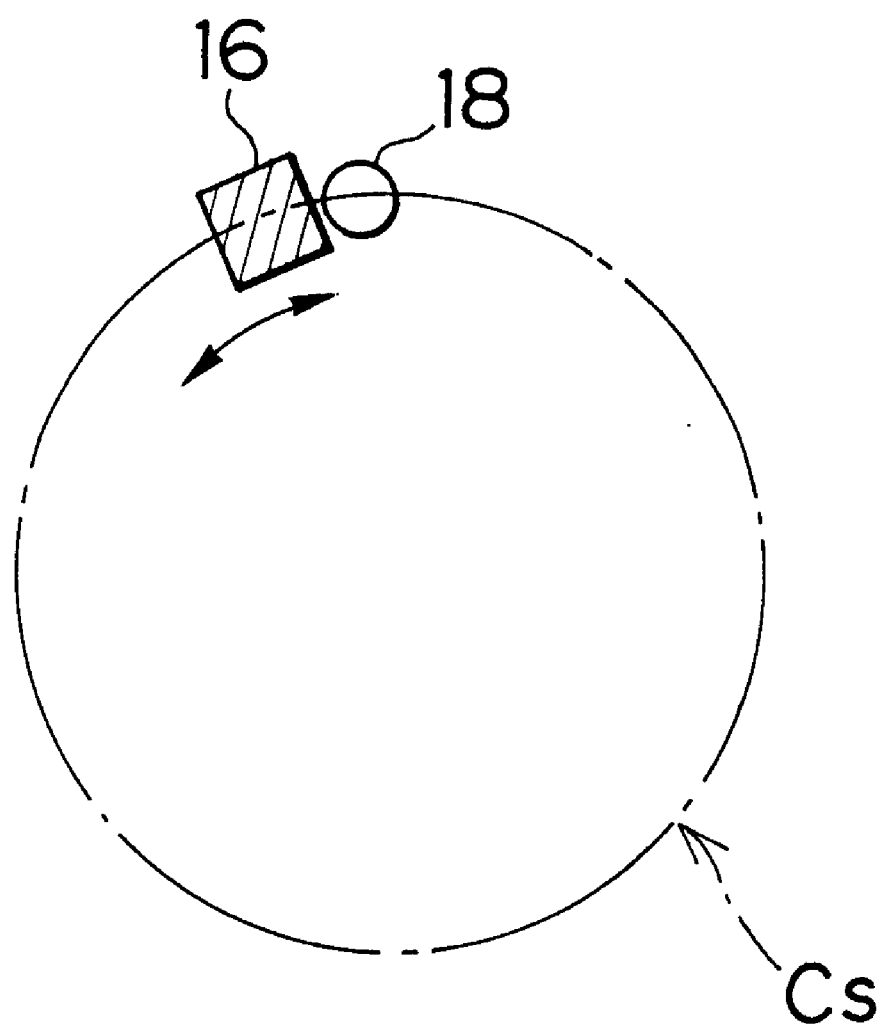
FIG. 2 is a schematic sectional view taken along line 2—2 in FIG. 1.

FIG. 1 shows a TV lens focus demand 10 according to an embodiment of the present invention, and FIG. 2 is a schematic sectional view taken along line 22 in FIG. 1. As shown in FIG. 1, the focus demand 10 comprises a control member or a knob 12, a rotary encoder 14 for determining the rotation of the knob 12, a gear 20 provided with a stopper pin 18 for regulating the rotation of the knob 12 by coming into contact with a stopper member 16 integrated with the knob 12, a power source or a motor 22 for giving a rotational driving force to the gear 20 through a gear 38, and a rotary encoder 24 for determining the rotation of the gear 20 through a gear 40.

The knob 12 is rotatably supported on a cylindrical part 27, which extends from a case 26 supporting the rotary encoder 14. The knob 12 is fixed to a shaft 30 with a setscrew 28. One or more projecting parts 12A (normally, they are formed at three or four positions at regular intervals) are provided on the circumference of the knob 12. The projecting parts 12A are used as finger rests.

The rotary encoder 14 is arranged at the rear end of the shaft 30 (the left end in FIG. 1) in the case 26, and the rotary encoder 14 is attached to the case 26 with a fixing member 32 and fixing screws 33. In association with the movement or rotation of the knob 12, the shaft 30 turns and the rotary encoder 14 outputs pulse signals corresponding to the rotational direction and amount of the knob 12.

The gear 20 is rotatably supported on the cylindrical part 27, and the stopper pin 18 is fixed to the top (the right side in FIG. 1) of the gear 20. A ring 36 prevents the gear 20 from moving along the axis. The stopper member 16 projects from the bottom side (the left side in FIG. 1) of the knob 12. When the knob 12 turns to bring the stopper member 16 into contact with the stopper pin 18, the knob 12 is prohibited from being turned anymore in the turning direction (clockwise in FIG. 2). That goes for the case where the knob 12 is turned in reverse direction (counterclockwise in FIG. 2) to bring the stopper member 16 into contact with the stopper pin 18.

The motor 22 is attached to the outside of the case 26 (at the top of the case 26 in FIG. 1), and the gear 38 is secured to a rotary shaft of the motor 22. The gear 38 engages with the gear 20. The rotational driving force is transmitted from the motor 22 to the gear 20 through the gear 38. Consequently, the gear 20 turns to move the stopper pin 18 in a circular orbit Cs shown in FIG. 2. The gear 38 may be a worm engaging with the gear 20.

Thus, the position where the stopper member 16 of the knob 12 comes on the stopper pin 18 can be changed, so that the rotational limits of the knob 12 can be changed. The terminals of the electric motor 22 are connected to each other when the stopper pin 18 reaches a target position, so that the electric motor 22 serves as a brake to stop the stopper pin 18 and to maintain the position of the stopper pin 18. An ultrasonic motor may be used as a power source for moving the stopper pin 18, and in this case, the stopper pin 18 stops while the current is present.

In FIG. 1, the rotary encoder 24 is attached to the bottom of the case 26, and detects the rotation of the gear 40 engaging with the gear 20. The rotary encoder 24 outputs pulse signals corresponding to the rotational direction and amount of the gear 40. The position of the stopper pin 18 can be determined and the motor 22 is controlled according to the signals outputted from the rotary encoder 24. A detailed description will later be given of a method for controlling the position of the stopper pin 18.

FIG. 3 is a block diagram showing the structure of a focus control system in a TV lens 50. FIG. 3 shows only one focus lens 52 to simplify the explanation, but the TV lens 50 is generally provided with a plurality of lens groups such as a fixed focus lens group, a movable focus lens group (simply shown as one lens 52 in FIG. 3), a variable frame lens group, a correcting lens group and a master lens group. Each lens group generally comprises multiple lenses.

A lens frame 53 of the focus lens 52 connects to a feedscrew 54. The rotational driving force of a motor 56 for driving the focus lens 52 is transmitted to the feedscrew 54 through gears 57 and 58 to thereby turn the feedscrew 54 and move the focus lens 52 forward and backward along the optical axis (horizontally in FIG. 3). The lens frame 53 may be integrated with the focus lens 52, and the structure or means for moving the focus lens 52 is not restricted to the one in FIG. 3. A well-known means may be selected arbitrarily as the means for moving the focus lens 52.

The motor 56 for driving the focus lens 52 is run according to commands from the focus demand 10 described with reference to FIG. 1 and is also controlled automatically by a lens control unit (not shown) when a preset shooting function and an auto-focusing function are performed.

The focus lens 52 is movable between an end E1 at a proximity side and an end E2 at an infinity side. A regulating means such as stopper members (not shown) prohibit the focus lens 52 from going beyond the movable area.

The TV lens 50 has a rotary encoder 60 for determining the position of the focus lens 52 (the focus position). Of course, it is possible to use another determining means such as a potentiometer instead of the rotary encoder 60.

The rotary encoder 60 determines the rotational direction and amount of the feedscrew 54 through the gears 58 and 61, and outputs pulse signals accordingly. It is possible to determine a relation between the absolute position of the focus lens 52, in other words, the position of the focus lens 52 with respect to the ends E1 and E2 by counting the number of pulses outputted from the rotary encoder 60.

The signal outputted from the rotary encoder 60 is equivalent to a focus lens position signal 64 indicating the position of the focus lens 52. The focus lens position signal 64 is supplied to a stopper position control circuit 66 of the focus demand 10.

On the other hand, the signal outputted from the rotary encoder 14 in FIG. 1 is equivalent to a knob position signal 68 indicating the position of the knob 12, and the knob position signal 68 is supplied to the stopper position control circuit 66. Likewise, the signal outputted from the rotary encoder 24 in FIG. 1 is equivalent to a stopper position signal 70 indicating the position of the stopper pin 18, and the stopper position signal 70 is supplied to the stopper position control circuit 66.

Moreover, a preset control circuit 74, which operates according to the operation of a preset function switch 72, supplies a signal indicating the start or end of the preset action to the stopper position control circuit 66. If there is an auto-focusing function, a signal indicating the start or end of the auto-focusing action is also supplied to the stopper position control circuit 66.

In accordance with the received position signals 64, 68 and 70 and the signals received from the preset control circuit 74, the stopper position control circuit 66 controls the motor 22 for moving the stopper pin 18 described with reference to FIG. 1.

A description will now be given of the operation of the lens control unit, which is constructed in the above-mentioned manner, as well as the method for controlling the motor 22.

Figure 4:
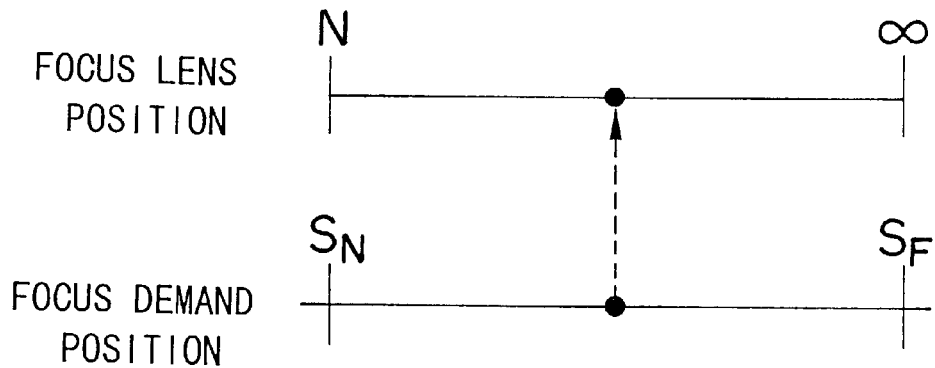
FIGS. 4(a), 4(b) and 4(c) are conceptual views of assistance in explaining a relation between a position of a focus lens and a position of a control member of the focus demand.
Figure 4:
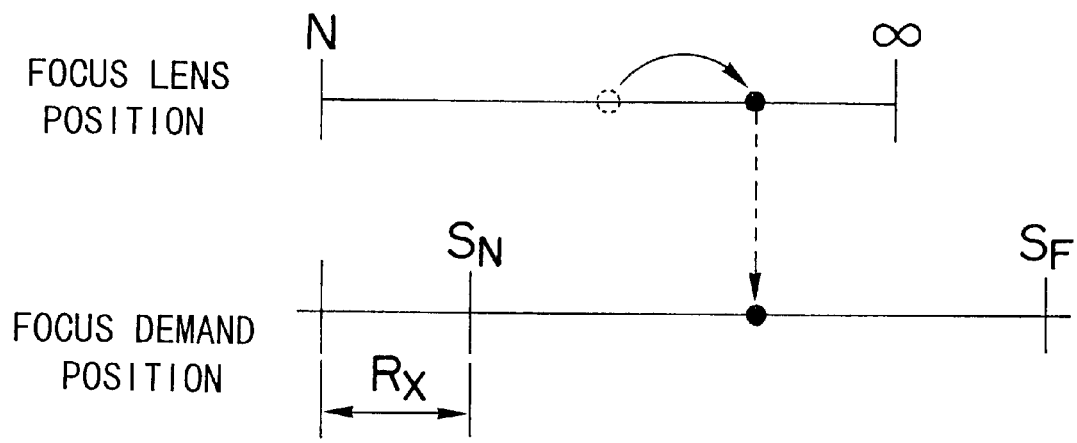
Figure 4:
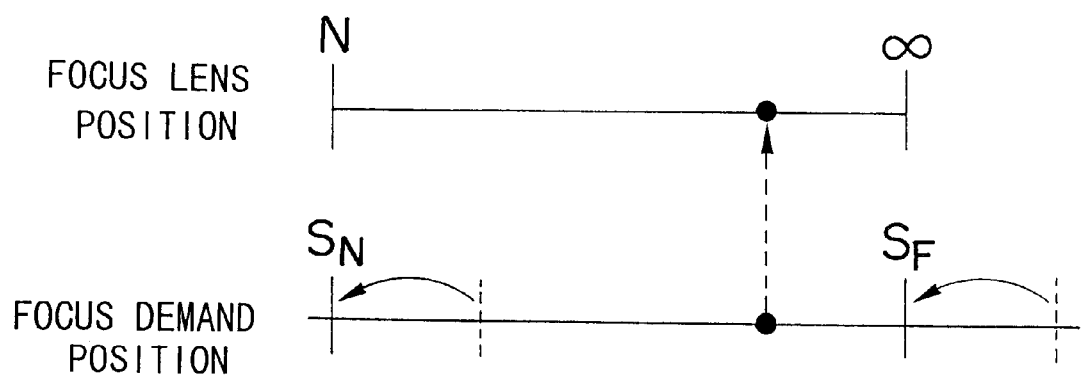

FIGS. 4(a), 4(b) and 4(c) conceptually show relations between the position of the focus lens 52 of the TV lens 50 and the position of the knob 12 of the focus demand 10. In FIGS. 4(a), 4(b) and 4(c), the upper side indicates the position of the focus lens 52. A dot represents the current position of the focus lens 52 in the movable area between the proximity end (N) and the infinity end (∞). On the other hand, the lower side indicates the position of the knob 12 of the focus demand 10. $S_N$ and $S_F$ indicate the rotational limits of the knob 12 regulated by the stopper pin 18, and a dot represents the relative position of the knob 12 in a movable area between the rotational limit ($S_N$) at the proximity side and the rotational limit ($S_F$) at the infinity side.

If the control functions such as the preset shooting function and the auto-focusing function other than the focus demand are not used, both movement ends of the focus lens 52 correspond to the rotational limits of the knob 12 of the focus demand 10 as shown in FIG. 4(a). The rotation of the knob 12 can control the focus lens 52 over the whole area between the proximity end (N) and the infinity end (∞).

If the control function other than the focus demand such as the preset shooting function operates to move the focus lens 52 and then the control function is cancelled, the rotational position of the knob 12 of the focus demand is relatively shifted by the movement of the focus lens 52 caused by the control function as shown in FIG. 4(b). If the focus lens 52 moves to the infinity side by the preset shooting function or the like as shown in FIG. 4(b), the focus lens position is connected with the current focus demand position. Consequently, the rotational limits of the knob 12 of the focus demand 10 cannot correspond to both movement ends of the focus lens 52. In this state, if the knob 12 of the focus demand 10 is turned to the proximity side, the rotation of the knob 12 is prohibited at the rotational limit $S_N$ short of the end (N), and the knob 12 cannot be turned anymore. For this reason, the focus lens 52 cannot be controlled in an area indicated by reference $R_X$ in FIG. 4(b). If the knob 12 of the focus demand 10 is turned to the infinity side, the focus lens 52 can be controlled up to the infinity end. However, when the focus lens 52 reaches the infinity end (∞), the knob 12 of the focus demand 10 is not prohibited from turning, and the operator cannot feel that the focus lens 52 has reached the end through the knob 12.

To address this problem, the rotational limits ($S_N$, $S_F$) of the knob 12 of the focus demand 10 of this embodiment are moved by the shifted amount so that both movement ends of the focus lens 52 can correspond to the rotational limits of the knob 12 of the focus demand 10. More specifically, if the control function such as the preset shooting function other than the focus demand 10 operates to move the focus lens 52, the stopper position control circuit 66 operates the motor 22 to move the stopper pin 18 so that the relation between the current position of the focus lens 52 and both movement ends of the focus lens 52 can correspond to the relation between the current position of the knob 12 of the focus demand 10 and both rotational limits of the knob 12.

When the power switch of the TV lens 50 is turned on, the focus lens 52 is forced to move to one end in the initial action, and the motor 22 of the focus demand 10 is made free (a brake is released) until the focus lens 52 reaches the end. When the focus lens 52 reaches the end, the motor 22 is controlled to set the position of the stopper pin 18 correspondingly to the end. In this initialization, the movement ends of the focus lens 52 can correspond to the rotational limits of the knob 12 of the focus demand 10. Even if the preset shooting function and the like operate afterwards, the movement ends of the focus lens 52 can correspond to the rotational limits of the knob 12 of the focus demand 10.

According to the focus demand 10 of this embodiment, if the control function such as the preset shooting function other than the focus demand and then the control is cancelled, the focus demand 10 is able to maintain the state of the focus lens 52 and maintains the relation between the rotational limits of the knob 12 and the movement ends of the focus lens 52 at the lens device. This enables the operator to feel the movement ends of the focus lens 52 through the rotational limits of the knob 12.

Once the position of the stopper pin 18 is corrected, it is unnecessary to control the position of the stopper pin 18 until the preset shooting function and the like operate the next time. This relieves the control burden and achieves the excellent mechanical durability.

In this embodiment, the stopper member 16 is fixed with respect to the knob 12 and the stopper pin 18 is controlled to move with respect to the case 26. Alternatively, the same effect is achieved by a mechanism in which the stopper member 16 is controlled to move with respect to the knob 12 and the stopper pin 18 is fixed with respect to the case 26.

In this embodiment, the explanation was given of the control system for the focus lens. The present invention may also be applied to any lenses that are position-controlled, such as a zoom lens.

According to the lens control unit of the present invention, the stopper member for defining the operational limits of the control member is movable, and the stopper member is moved so that the operational limits of the control member can correspond to the movement ends of the lens. Thus, if the control function such as the preset shooting function other than the lens control unit is operated and then the control function is cancelled, the state of the lens can be maintained and the correspondence between the operational limits of the control member and the movement ends of the lens can be maintained. The operator can feel the movement ends of the lens through the operational limits of the control member.

It should be understood, however, that there is no intention to limit the invention to the specific forms disclosed, but on the contrary, the invention is to cover all modifications, alternate constructions and equivalents falling within the spirit and scope of the invention as expressed in the appended claims.

What is claimed is:

1. A lens control unit for outputting a signal corresponding to displacement of a control member and controlling a position of a lens according to the signal, the lens control unit comprising:

the control member;

a stopper member for defining an operational limit of and which impacts with the control member to thereby mechanically prevent subsequent movement of the control member;

a support mechanism for movably supporting the stopper member;

a power source for supplying power to the support mechanism to move the stopper member;

a control part for controlling the power source to move the stopper member so that the operational limit of the control member with respect to a current position of the control member corresponds to a movement end of the lens with respect to a current position of the lens; and preset functions for automatically moving the lens to a subsequent position according to prestored lens position data, wherein the functions are activated to move the stopper member to correct displacement between the operational limit of the control member and the movement end of the lens.

\* \* \* \* \*